United States Patent
Donato et al.

(10) Patent No.: US 10,197,242 B2
(45) Date of Patent: *Feb. 5, 2019

(54) LENS ARRAYS AND MOUNTINGS

(71) Applicant: SCHREDER, Brussels (BE)

(72) Inventors: Luigi Donato, Oreye (BE); Hervé Damoiseau, Saive (BE)

(73) Assignee: SCHREDER, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/907,145

(22) Filed: Feb. 27, 2018

(65) Prior Publication Data

US 2018/0187862 A1  Jul. 5, 2018

Related U.S. Application Data

(63) Continuation of application No. 14/975,069, filed on Dec. 18, 2015, now Pat. No. 9,939,125.

(30) Foreign Application Priority Data

Jan. 26, 2015 (EP) .................................. 15152505

(51) Int. Cl.
| | |
|---|---|
| *F21V 1/00* | (2006.01) |
| *F21V 5/00* | (2018.01) |
| *G02B 19/00* | (2006.01) |
| *F21V 17/00* | (2006.01) |
| *G02B 3/00* | (2006.01) |

(Continued)

(52) U.S. Cl.
CPC ............ *F21V 5/007* (2013.01); *F21V 17/005* (2013.01); *F21V 17/06* (2013.01); *F21V 23/005* (2013.01);
(Continued)

(58) Field of Classification Search
CPC ... F21V 1/00; F21V 11/00; F21V 5/00; F21V 8/00; F21V 3/00
(Continued)

(56) References Cited

U.S. PATENT DOCUMENTS

| | | |
|---|---|---|
| 8,405,015 B1 | 3/2013 | Klein |
| 9,212,803 B2 | 12/2015 | Auyeung |
| | (Continued) | |

FOREIGN PATENT DOCUMENTS

| | | |
|---|---|---|
| DE | 202012003680 U1 | 5/2012 |
| WO | 2013142437 A1 | 9/2013 |

OTHER PUBLICATIONS

European Search Report, completed Apr. 13, 2015, issued in corresponding European Application No. EP 15152505.2, filed Jan. 26, 2015, 8 pages.

*Primary Examiner* — Edwyn Labaze
(74) *Attorney, Agent, or Firm* — Christensen O'Connor Johnson Kindness PLLC

(57) ABSTRACT

A light-emitting diode module includes a printed circuit board with a light-emitting diode array mounted on first surface. A secondary lens array is positioned over the light-emitting diode array and includes a secondary lens element for each light-emitting diode element in the light-emitting diode array. A lens holder is mounted to the printed circuit board and configured to retain each secondary lens element of the secondary lens array in alignment in an x-y plane with respect to each light-emitting diode element of the light-emitting diode array. The printed circuit board further includes a first locating feature corresponding to a second locating feature of either the secondary lens array or the lens holder. The locating features align the secondary lens array with respect to the light-emitting diode array on the printed circuit board.

20 Claims, 5 Drawing Sheets

(51) Int. Cl.
*F21V 17/06* (2006.01)
*F21V 23/00* (2015.01)
*F21V 5/04* (2006.01)
*F21V 7/00* (2006.01)
*F21W 131/103* (2006.01)
*F21K 9/20* (2016.01)
*F21Y 105/10* (2016.01)
*F21Y 115/10* (2016.01)
*F21K 9/69* (2016.01)

(52) U.S. Cl.
CPC ......... *G02B 3/0056* (2013.01); *G02B 3/0075* (2013.01); *G02B 19/0066* (2013.01); *F21K 9/20* (2016.08); *F21K 9/69* (2016.08); *F21V 5/04* (2013.01); *F21V 7/0091* (2013.01); *F21W 2131/103* (2013.01); *F21Y 2105/10* (2016.08); *F21Y 2115/10* (2016.08)

(58) Field of Classification Search
USPC .................... 362/238, 245, 268, 311.02, 333
See application file for complete search history.

(56) References Cited

U.S. PATENT DOCUMENTS

| | | |
|---|---|---|
| 2005/0083696 A1 | 4/2005 | Chiang et al. |
| 2006/0279626 A1 | 12/2006 | Tu et al. |
| 2008/0043466 A1 | 2/2008 | Chakmakjian |
| 2010/0284089 A1* | 11/2010 | Shyu .................... G02B 3/0062 359/622 |
| 2011/0103051 A1 | 5/2011 | Wilcox |
| 2011/0280014 A1 | 11/2011 | Householder |
| 2012/0268930 A1 | 10/2012 | Lu |
| 2012/0300456 A1 | 11/2012 | Phillips et al. |
| 2013/0058088 A1 | 3/2013 | Lan |
| 2013/0135694 A1* | 5/2013 | Yamamura ............... H04N 1/10 358/474 |
| 2014/0268761 A1 | 9/2014 | Raleigh |
| 2015/0204491 A1 | 7/2015 | Yuan et al. |
| 2016/0033089 A1 | 2/2016 | Wang et al. |
| 2016/0044776 A1* | 2/2016 | Park ....................... H05K 1/181 362/97.1 |

* cited by examiner

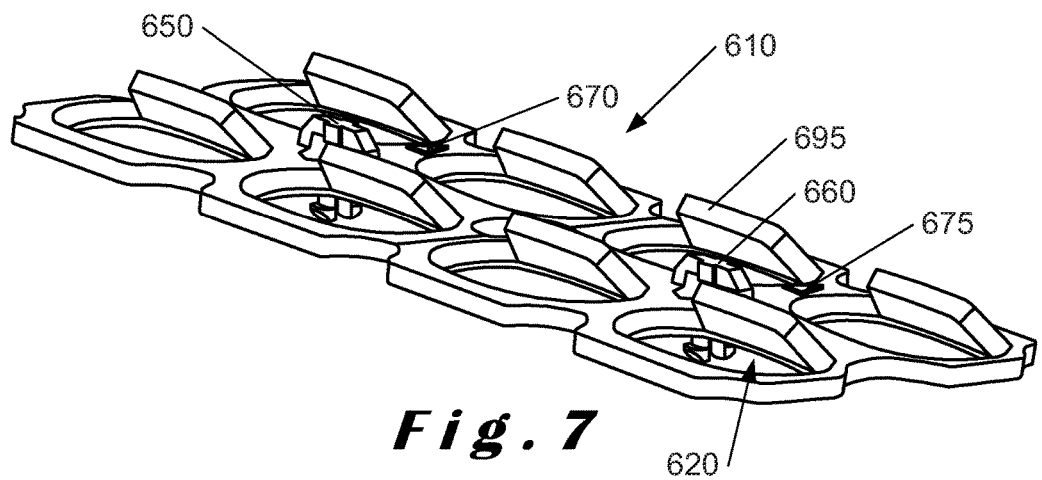
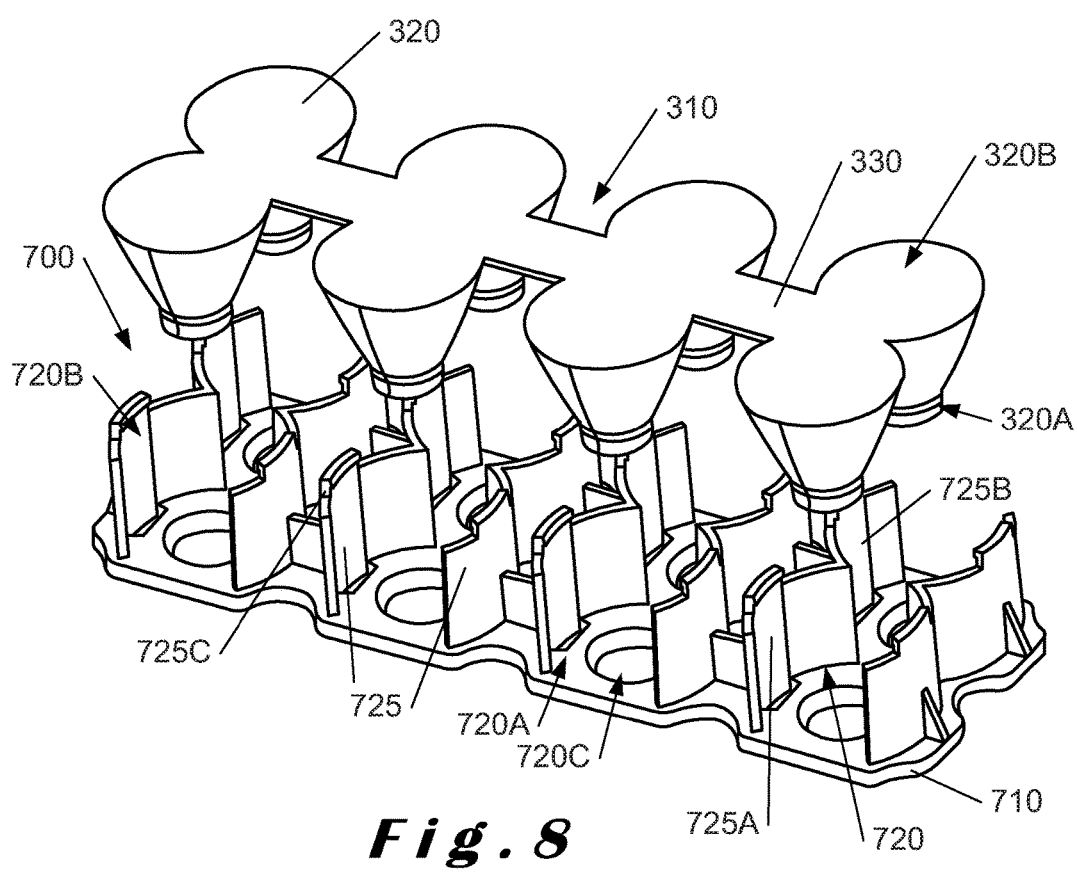

LENS ARRAYS AND MOUNTINGS

CROSS-REFERENCE TO RELATED APPLICATION(S

This application is a continuation of U.S. application Ser. No. 14/975,069, filed Dec. 18, 2015, which is based on EP 15152505.2, filed Jan. 26, 2015, the disclosures of which are hereby expressly incorporated by reference herein in their entirety.

FIELD OF THE INVENTION

The present invention relates to improvements in or relating to lens arrays, and is more particularly concerned with the mounting of such lens arrays with respect to light-emitting diode elements mounted on a printed circuit board.

BACKGROUND

Light emitting diode (LED) based luminaires often comprise modules including printed circuit boards (PCBs) on which the LEDs are mounted. The LEDs are typically arranged in an array or pattern and mounted on the PCB, often termed PCB assembly (PCBA), which is appropriate for the luminaire in which they are to be used. Whilst each LED comprises a light source with a primary optical element or lens, secondary optical elements are often required to direct the light produced by these light sources in directions appropriate to the particular implementation in a luminaire. Lenses are typically used as the secondary optical elements for directing the light.

In current applications, most secondary lenses are made out of rather rigid materials, such as polymethylmethacrylate (PMMA) or polycarbonate, and are mounted on the PCBA by the use of screws or rivets which provide precise positioning of the secondary lenses with respect to the associated LEDs.

Unfortunately, the use of PMMA or polycarbonate lenses as secondary lenses tends to limit the operating temperature of the PCBA. Conventional plastic materials such as PMMA and polycarbonate cannot be exposed to temperatures exceeding 85° C. without long term deterioration, for example, due to thermo-oxidation. The LEDs and PCBAs, particularly when they comprise metal core PCBs (MCP-CBs), are more resistant to higher temperatures, and, the material from which the secondary lenses are most often made limits the maximum operable temperature of the assembly. This limitation in temperature necessitates the provision of good dissipation techniques on the luminaire to keep the temperatures under this limit. This requires costly heat dissipating structures, for example, heat sinks which increase the amount of metal, for example, aluminium, required in the manufacture of the luminaire housing or body in which the LEDs are mounted.

Silicone is now being implemented in more and more applications as secondary lenses for use with PBCAs as it can operate at higher temperatures than PMMA and polycarbonate without significant degradation of the material, whilst providing optical properties that remain consistent over extended periods of time. Silicone is a proven material for use in encapsulated LED primary lenses due to its ability to operate at higher temperatures.

However, when implementing silicone as a single moulded lens array, it becomes difficult to mount the array precisely on the PCBA and to maintain precise alignment between the secondary lenses and the LEDs. This is due to silicone itself being a soft material and the moulded lens array is flexible. More particularly, due to the relative softness and flexibility of the material, it is no longer possible to use conventional mounting techniques, for example, using screws, rivets, etc.

Furthermore, the goal of achieving higher operating temperatures generates even more severe constraints due to different thermal characteristics of the materials from which the secondary lenses and PCBA are made. These characteristics need to be taken into account to provide a reliable mounting of the lenses whilst also maintaining correct lens alignment with respect to the LEDs during temperature changes.

SUMMARY

It is therefore an object of the present invention to provide a method of providing precise alignment between a moulded secondary lens array made of a soft, flexible material and an array of LED elements mounted on a printed circuit board.

It is another object of the present invention to provide a method of attaching a moulded secondary lens array to a printed circuit board which provides precision of mounting in three-dimensions.

It is a further object of the present invention to provide means for attaching a moulded secondary lens array with precision which does not require any tools.

It is yet another object of the present invention to provide means for compensating for different thermal characteristics of the components in an LED module.

In accordance with one aspect of the present invention, there is provided a light-emitting diode module comprising:— a printed circuit board having a first surface and a second surface;

a light-emitting diode array mounted on first surface of the printed circuit board, the printed circuit board providing electrical connections to each light-emitting diode element in the light-emitting diode array; and a secondary lens array operable for being positioned over the light-emitting diode array, the secondary lens array including a secondary lens element for each light-emitting diode element in the light-emitting diode array;

characterised in that the module further comprises a lens holder mountable to the printed circuit board and operable for retaining each secondary lens element of the secondary lens array in alignment in an x-y plane with respect to each light-emitting diode element of the light-emitting diode array and for maintaining the secondary lens array at a predetermined distance, in a direction perpendicular to the x-y plane, from the first surface of the printed circuit board;

and in that the printed circuit board comprises locating means corresponding to one of: locating means of the secondary lens array and locating means of the lens holder for providing the alignment of the secondary lens array with respect to the light-emitting diode array on the printed circuit board.

By providing the alignment in the x-y plane, and, also in the direction perpendicular to the x-y plane, it is possible to retain the secondary lens elements in a fixed relationship with respect to the printed circuit board and the light-emitting diode elements formed thereon. In addition, there is no possibility of any deformation of the secondary lens array which would create spaces between the array and the light-emitting diode elements on the printed circuit board.

In addition, correct x-y positioning of the secondary lens elements on the printed circuit board is maintained throughout the operating temperature range of the light-emitting diode module.

The locating means of the printed circuit board comprises at least one aperture formed therethrough and the locating means of the lens holder comprises at least one clip formed on a surface thereof, each clip being operable for engaging an associated aperture when the module is assembled.

In one embodiment, the secondary lens array comprises a free form lens array having a first surface and a second surface located on opposite sides thereof, the secondary lens elements being formed as a convex surface in the first surface and as a concave surface in the second surface respectively of the free form lens array.

The lens holder may comprise a frame operable to secure the free form lens array to the printed circuit board, the frame having a first surface and a second surface which are located on opposite sides thereof with apertures formed therethrough for receiving respective ones of the secondary lens elements.

The frame may preferably include at least one hole for receiving at least one pin formed in the first surface of the free form lens array, the first surface of the free form lens array being aligned with a second surface of the lens holder so that each pin extends through an associated hole.

In this embodiment, the secondary lens array is positioned between the first surface of the printed circuit board and the second surface of the lens holder. The second surface of the free form lens array may further comprise at least one positioning pin for engaging a corresponding recess formed in the printed circuit board. In one embodiment, there are two positioning pins, each one having a different cross-section.

By using such a lens holder, no excessive pressure is applied to the free form lens array which could generate any optical distortion of the secondary lens elements.

In another embodiment, the lens holder may further comprise an element for each secondary lens element of the secondary lens array formed in the first surface of the lens array in the proximity of an associated aperture to prevent backlighting.

In a further embodiment, the secondary lens array comprises a collimator lens array including a plurality of collimator lens elements.

In this embodiment, the lens holder may comprise a frame operable to mount the collimator lens array to the printed circuit board, the frame having a first surface and a second surface which are located on opposite sides thereof, the first surface having a plurality for recesses defined therein, each recess corresponding to a light-emitting diode of the light-emitting diode array and being operable to receive an associated collimator lens element.

In this embodiment, the lens holder includes at least one positioning pin located on its second surface for engaging a corresponding aperture formed at least in the first surface of the printed circuit board. In a preferred implementation of this embodiment, the lens holder includes two positioning pins each having a cross-section and the first surface of the printed circuit board has two apertures each being shaped to receive a corresponding positioning pin.

The lens holder may further comprise at least one clip formed in an edge portion of each recess, each clip being operable to retain a collimator lens element in the associated recess.

By providing a lens holder with recesses for receiving the collimator lens elements and using the clips at the edges of the recesses, no excessive pressure is applied to the material from which the collimator lens elements are made which could generate any optical distortion of the lens elements.

In accordance with the present invention, each secondary lens array preferably comprises an optical grade silicone material and the secondary lens array is moulded as a single component.

In accordance with another aspect of the present invention, there is provided a luminaire having a light-emitting diode module as described above.

In accordance with a further aspect of the present invention, there is provided a method of assembling a light-emitting diode module comprising a printed circuit board having a first surface and a second surface, a light-emitting diode array mounted on first surface of the printed circuit board, a secondary lens array, and a lens holder having a first surface and a second surface, the method comprising:— providing locating means on the first surface of the printed circuit board;

providing locating means on one of: the second surface of the secondary lens array and the second surface of the lens holder;

forming a lens array assembly by assembling the secondary lens array in the lens holder; and mounting the lens array assembly on the first surface of the printed circuit board;

characterised in that the locating means on the first surface of the printed circuit board cooperates with the locating means on one of: the second surface of the secondary lens array and the second surface of the lens holder to align the secondary lens array with the light-emitting diode array in an x-y plane and to maintain the secondary lens array at a predetermined distance, in a direction perpendicular to the x-y plane, from the first surface of the printed circuit board.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 illustrates a perspective view of another embodiment of a lens holder for use with a free form lens array;

FIG. 8 illustrates an exploded perspective view of a collimator lens array assembly;

DETAILED DESCRIPTION

Figure 1A:
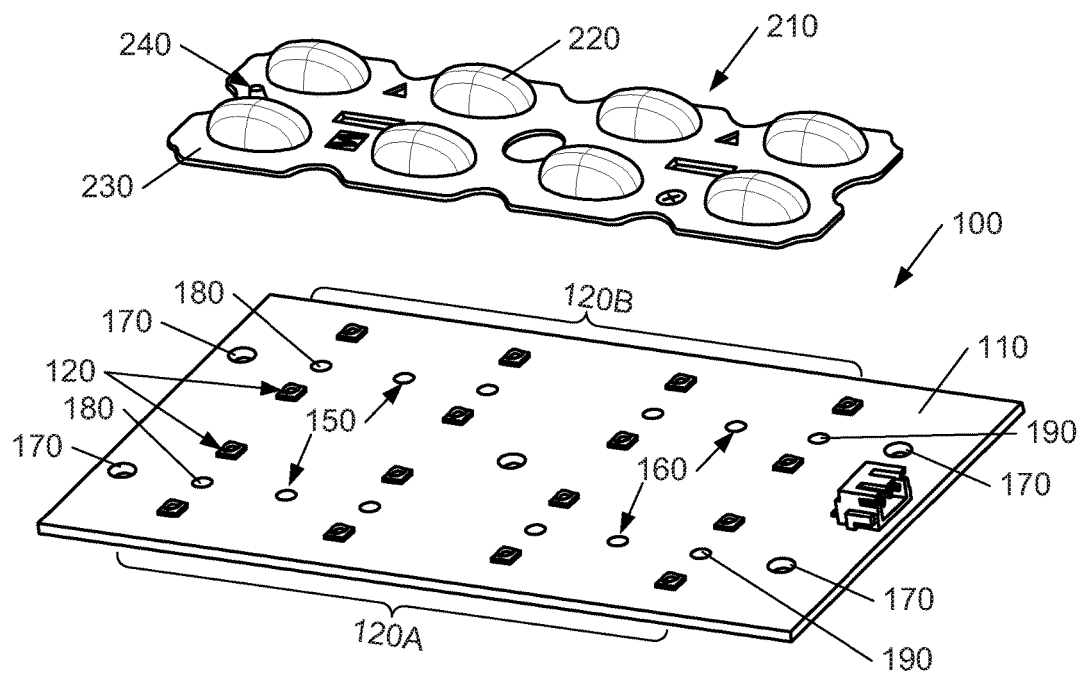
FIG. 1A illustrates a perspective view of a free from lens array to be mounted on a printed circuit board.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Throughout the following description, identical components bear the same reference numerals.

Although the present invention will be described with reference to LED modules suitable for luminaires, it will readily be appreciated that the invention is not limited to such an implementation and can be used in any LED module, particularly if it requires use at higher temperatures.

The term "higher temperatures" as used herein refers to temperatures in excess of 85° C., and can refer to temperatures as high as 150° C.

The term "silicone material" as used herein refers to an optical grade silicone material having a Shore 00 hardness value in the range of between 60 and 100. As will readily be understood, these values range from soft to medium hard and will affect the pliability, flexibility and durability of lens arrays made from such materials.

The term "light-emitting light diode module" or "LED module" as used herein refers to an assembly of a PCB on which are mounted an array of LED elements, a secondary lens array and a lens holder for mounting the secondary lens array on the PCB. It is essential that each element of the secondary lens array is correctly aligned with an associated LED element in the LED array formed on the PCB.

The term "free form lens array" as used herein refers to a lens array which the lens elements are designed as light beam shapers to create a predetermined light distribution and which are positioned over associated LED elements of an LED array. Free form lens arrays are typically used as secondary lenses in luminaires for street lighting applications. In accordance with the present invention, the free form lens array is moulded as a single component from an optical grade silicone material.

The term "collimator lens array" as used herein refers to a lens array in which the lens elements comprise beam collimators. Collimator lens arrays are used to deliver focussed beams of light and may be used as secondary lenses in luminaires for specialised projectors in illumination or sport lighting applications or other more specific lighting applications. The collimator lens array is moulded as a single component from an optical grade silicone material.

The term "lens array" as used herein refers to an arrangement or pattern of at least one lens element. In the embodiments described below, each lens array comprises eight lens elements which are integrally formed as a single component. It will, however, be appreciated a lens array may comprise any number of lens elements which may either be integrally formed as described below, or separately formed and arranged to form the lens array.

Silicone lenses used as secondary lenses may have different sizes and structures depending on their optical properties, and enable operation of lighting devices incorporating such lenses at higher temperature ranges. This means that it is possible to either increase the operating temperature range whilst using conventional heat sinks for heat dissipation or to reduce the amount of heat sinks required for heat dissipation without adversely affecting the operation of the luminaire. Naturally, by reducing the amount of material needed for heat dissipation, cost benefits can be provided.

It will readily be appreciated that the optical properties of the silicone lenses needs to be maintained over the full operating temperature and not show any degradation over time when operating at higher temperatures.

Figure 1B:
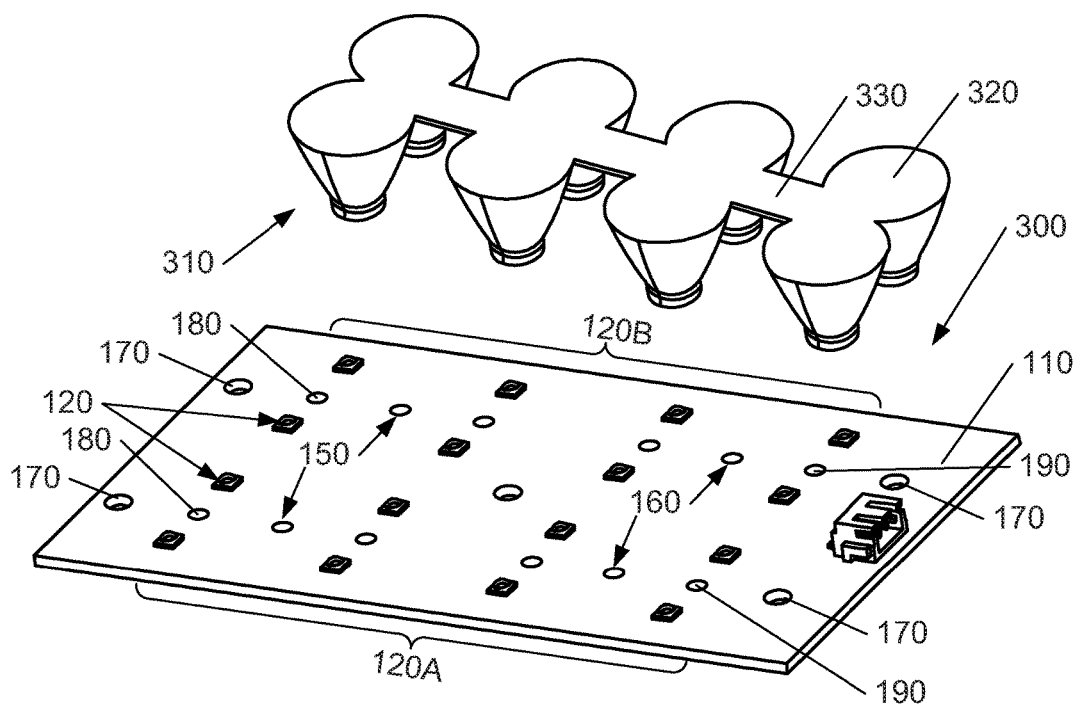
FIG. 1B illustrates a perspective view of a collimator lens array to be mounted on a printed circuit board.

FIGS. 1A and 1B illustrate two examples of secondary lenses integrally formed as one component using injection moulding techniques.

FIG. 1A illustrates an exploded view of a free form lens array assembly 100. The assembly 100 comprises a PCB 110 on which are mounted sixteen LED elements 120 arranged as two groups 120A, 120B of eight elements. The PCB 110 also includes mounting holes 150, 160 to which a free form lens array 210 is mounted as will be described in more detail below. Mounting holes 170 are also provided in the PCB 110 for mounting the assembly 100 to a luminaire housing (not shown), and positioning apertures or holes 180, 190 are provided for the correct alignment of a lens array assembly as will be described in more detail below.

The assembly 100 also comprises a free form lens array 210 is which can be mounted over either group 120A or group 120B of LED elements 120. The free form lens array 210 comprises eight secondary lens elements 220, arranged in a two-by-four configuration, joined together by a skirt portion 230 which surrounds each of the secondary lens elements 220. Each secondary lens element 220 comprises a convex portion 220A (shown more clearly in FIG. 2) formed as part of a first surface and a concave portion 220B (shown in FIG. 3) formed as part of a second surface respectively of the free form lens array 210. Naturally, a second free form lens array (not shown) may be provided for the other group of LED elements 120.

It will readily be appreciated that the free form lens array 210 is not limited to eight secondary lens elements 220 and may comprise any suitable number of secondary lens elements in accordance with the particular lighting application in which the free form lens array 210 is to be used. Moreover, the alignment and/or orientation of the secondary lens elements 220 within the free form lens array 210 is not limited to the alignment and orientation shown in FIG. 1A and described herein and may be any other suitable alignment and/or orientation in accordance with the particular lighting application.

An alignment pin 240 is formed in the skirt portion 230 of the free form lens array 210 which aligns with a corresponding aperture or hole in a lens holder as will be described in more detail below. Other markings (not shown in detail) may be present on the skirt portion 230 which are intended to provide correct alignment with respect to the PCB 110 and the LED elements 120 of an LED array formed thereon.

FIG. 1B illustrates an exploded view of a collimator lens array assembly 300. The collimator lens assembly comprises PCB 110, described above with reference to FIG. 1A, and one collimator lens array 310 which can be mounted over either group 120A or group 120B. The collimator lens array 310 comprises eight secondary lens elements 320, arranged in a two-by-four configuration, joined together by an elongate strip 250 extending down the centre of the collimator lens array 310. Again, a second collimator lens array (not shown) may be provided over the other group of LED elements 120.

It will readily be appreciated that the collimator lens array 310 is not limited to eight secondary lens elements 320 and may comprise any suitable number of lens elements in accordance with the particular lighting application in which the collimator lens array 310 is to be used. Moreover, the alignment of the secondary lens elements 320 within the collimator lens array 310 is not limited to the alignment shown in FIG. 1B and described herein and may be any other suitable alignment in accordance with the particular lighting application.

As described above, in both the embodiments shown in FIGS. 1A and 1B, it is essential that there is correct alignment of the secondary lenses with respect to the LED elements in the LED array, and hence, an x-y plane defined by the surface of the PCB, and that that alignment is maintained through the full operating temperature range of the LED module of which the secondary lenses form a part.

In addition, it is essential that there is no deformation of the secondary lens array in a direction perpendicular to the x-y plane that would create any space between the secondary lens array and the LED array on the PCB due to the soft, flexible material of the silicone lenses without creating excess pressure that could generate optical distortions in the secondary lens array.

Moreover, in addition to the requirements described, the assembly of the secondary lenses on the PCBs needs to be easy and straightforward in an industrial environment.

In accordance with the present invention, a lens holder is provided for mounting the secondary lens array with respect to the PCB. In one embodiment, the lens holder comprises a simple frame to surround and retain the secondary lens elements, and, in another embodiment, the lens holder comprises a shaped structure to support the secondary lens array as will be described in more detail below.

Figure 2:
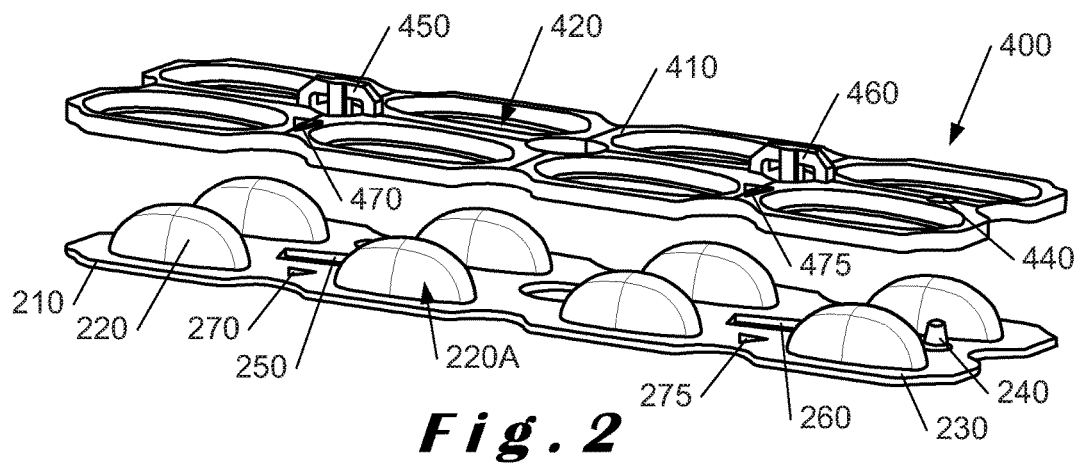
FIG. 2 illustrates a perspective exploded view of a first embodiment of a lens array assembly comprising the free form lens array of FIG. 1A.
Figure 6:
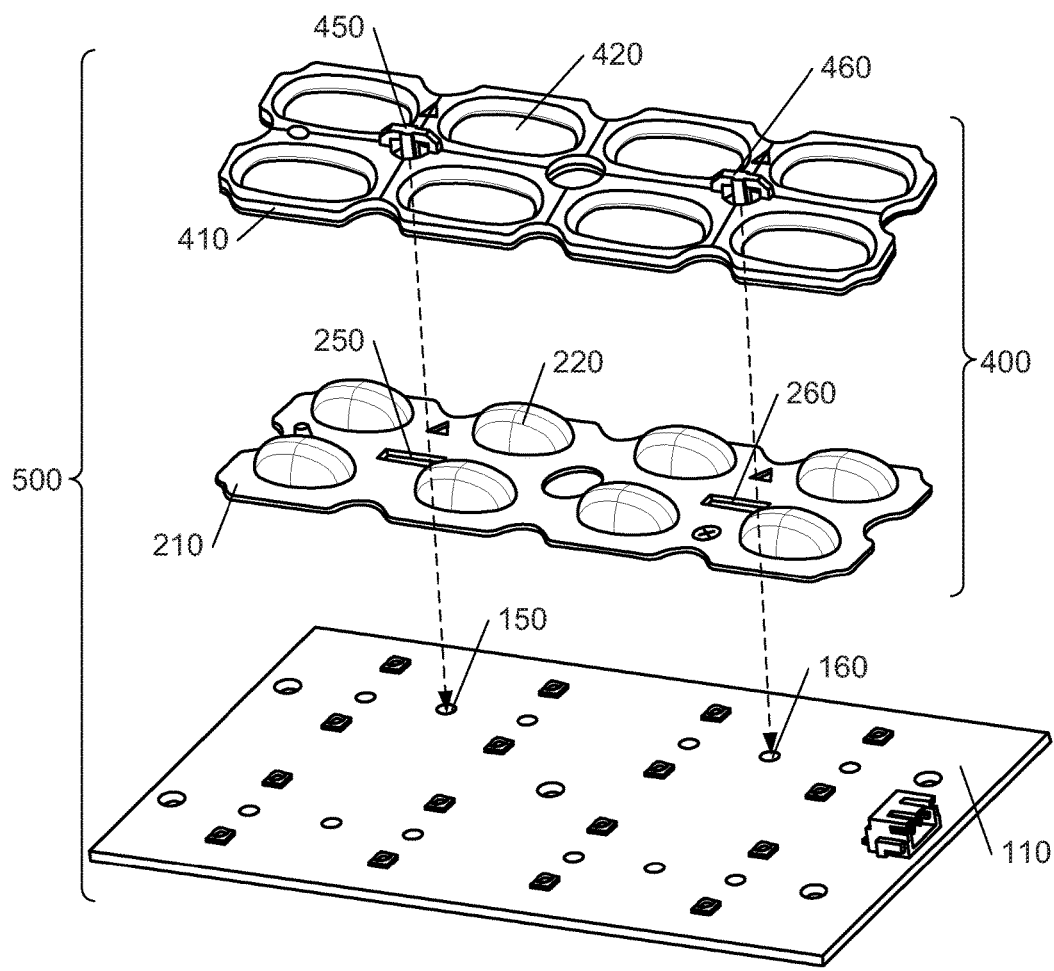
FIG. 6 illustrates an exploded perspective view of one embodiment of an LED module in accordance with the present invention.

Referring now to FIG. 2, an exploded view of a first embodiment of a lens array assembly 400 is shown. The lens array assembly 400 comprises the free form lens array 210 shown in FIG. 1A and a lens holder 410. The lens holder 410 comprises a frame having eight apertures 420 shaped to receive a respective one of the secondary lens elements 220 when assembled. The lens holder 410 has a first surface and a second surface, the second surface being in contact with the first surface of the free form lens array 210 when assembled, that is, the lens holder 410 is positioned over the free form lens array 210 and is not in contact with the PCB 110. The second surface of the free form lens array 210 is in contact with the PCB 110 when an LED module (as shown in FIG. 6) is assembled. It will be appreciated that, although not shown, the concave portion 220B of each secondary lens element 220 is placed nearer to the LED element which it is associated than the convex portion 220A.

The frame includes an aperture or hole 440 with which the alignment pin 240 of the skirt portion 230 of the free form lens array 210 engages when assembled. This ensures correct alignment of the free form lens array 210 with the lens holder 410 so that the secondary lens elements 220 are located within apertures 420 of the lens holder 410, with their convex portions 220A above the frame, when the lens holder 410 is assembled with the free form lens array 210.

Clips 450, 460 are provided as part of the lens holder 410 for aligning with corresponding apertures or holes 250, 260 formed in the skirt portion 230 of the free form lens array 210 as shown. As shown, the apertures or holes 250, 260 may comprise elongate slots, but the apertures or holes 250, 260 are not limited to such a configuration.

The clips 450, 460 extend through the apertures or holes 250, 260 when the frame 410 is assembled with the free form lens array 210 as will be described in more detail below. The clips 450, 460 are moulded from the same material as the frame and are integrally formed therewith.

When an LED module is assembled, as will be described in more detail below, the clips 450, 460 extend through into corresponding holes 150, 160 formed in the PCB 110.

Markings 470, 475 on the first surface of the frame 410 are aligned with corresponding markings 270, 275 provided on the first surface of the free form lens array 210, and in particular, on the skirt portion 230 thereof.

Figure 3:
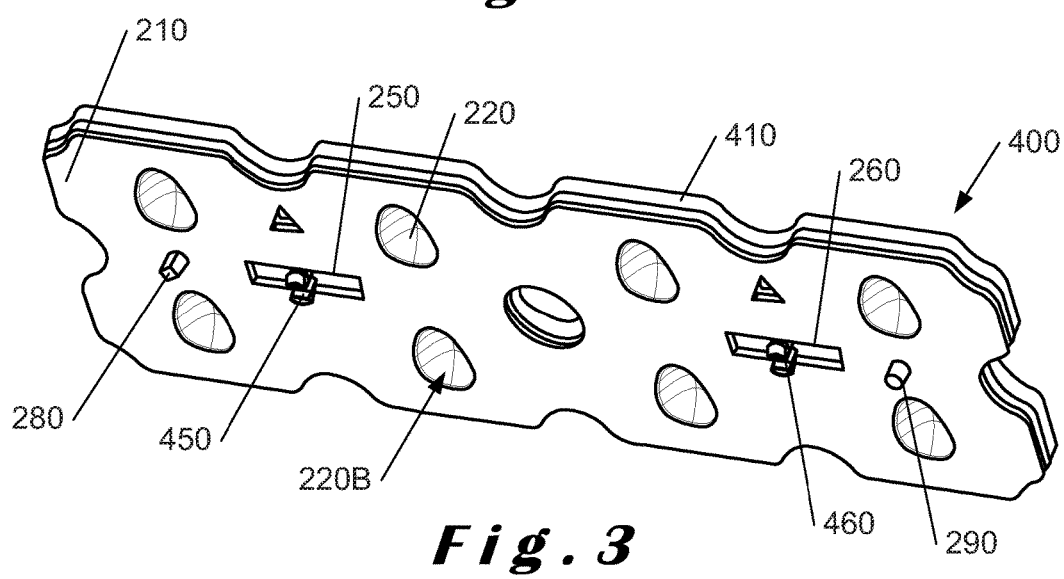
FIG. 3 illustrates a perspective view of the lens array assembly of FIG. 2 but viewed from underneath.

FIG. 3 illustrates the lens array assembly 400 from underneath, that is, from the second surface of the free form lens array 210. As shown, the first surface of the free form lens array 210 is in contact with the second surface of the lens holder array 410. Positioning pins 280, 290 are provided on the second surface of the free form lens array 210 which engage with corresponding apertures or holes 180, 190 provided in the PCB 110 (as described above with reference to FIG. 1A).

The positioning pins 280, 290 are shaped to allow for thermal expansion of an assembled LED module (not shown) without creating any deformation in the free form lens array 210. In one embodiment as shown, one pin 290 has a circular cross-section and the other pin 280 has a rhomboid (lozenge) cross-section. However, it will be appreciated that other cross-sections are possible for the positioning pins 280, 290 as long as they can accommodate dimensional changes due to thermal expansion.

The positioning pins 280, 290 provide correct referencing of the free form lens array 210 with respect to the PCB 110 when inserted into corresponding apertures 180, 190 in the PCB 110. This reference is maintained between the free form lens array 210 and the PCB 110 with the lens holder 410 being prevented from putting any mechanical constraint on this positioning. In effect, the lens holder 410 is only used to maintain the second surface of the free form lens array 210 in contact with the first surface of the PCB 110.

As described above with reference to FIG. 2, the lens holder 410 incorporates clips 450, 460 which provide a simple and rigid mounting of the lens holder 410 to both the free form lens array 210 and the PCB 110. The positioning of these clips 450, 460 and their flexibility is crucial to maintain the lens holder 410 properly aligned with respect to the free form lens array 210 and to the PCB 110 whilst adjusting for thermal expansion.

Figure 4:
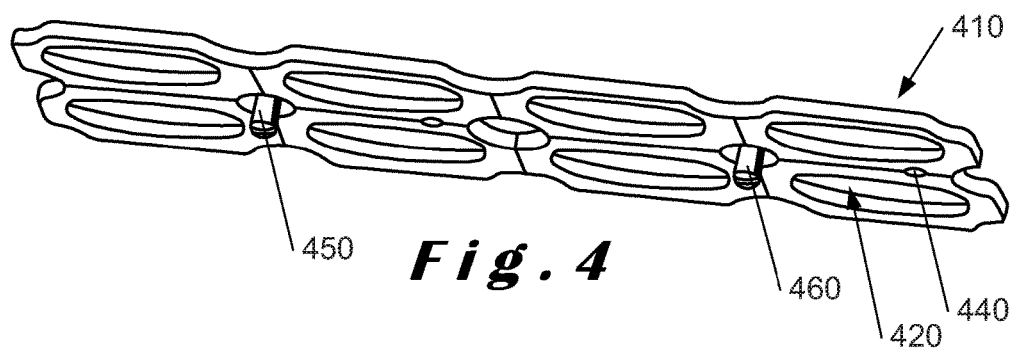
FIG. 4 illustrates a perspective view of the lens holder of FIGS. 2 and 3 when viewed from underneath.

FIG. 4 illustrates a perspective view of the lens holder 410 from underneath so that the location of the clips 450, 460 and the aperture or hole 440 can clearly be seen. As described above, the clips 450, 460 are flexible and are designed to have sufficient flexibility to adjust with differences in thermal expansion between the material from which the PCB 110 is made and the material from which the lens holder 410 is made. Non-limiting examples of materials from which the lens holder 410 may be made include thermoplastic materials, for example, polycarbonate (PC), polyphenylene sulphide (PPS), polybutylene terephthalate (PBT) and polyamide (PA).

Figure 5:
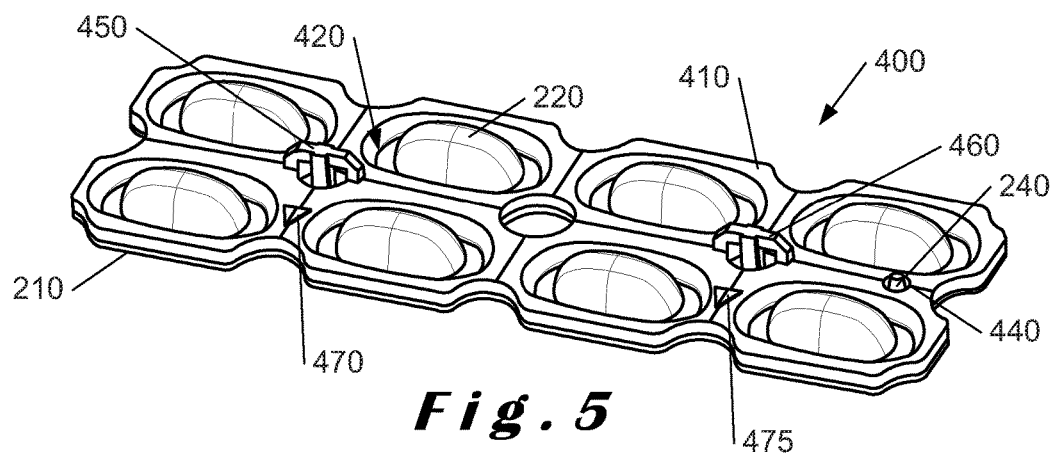
FIG. 5 illustrates a perspective view of the lens array assembly of FIG. 3 but viewed from the top.

FIG. 5 illustrates a top perspective view of the lens array assembly 400. As shown, the markings 470, 475 and the aperture or hole 440 formed on or in the lens holder 410 are used to ensure that there is correct orientation with the free form lens array 210. As described above, markings 470, 475 are matched to corresponding markings 270, 275 on the free form lens array 210 as shown in FIG. 2. The aperture or hole 440 is sized to accommodate the positioning pin 240 formed on the skirt portion 230 of the free form lens array 210, and is used as a "foolproof" mounting mechanism.

The provision of the markings 270, 275 and pin 240 on the free form lens array 210 and the markings 470, 475 and aperture or hole 440 on the lens holder 410 ensures that lens holder 410 is correctly oriented with the free form lens array 210 when being assembled. It will readily be appreciated that other methods of ensuring that the free form lens array 210 is correctly oriented with respect to the lens holder 410 are possible, for example, shaped protrusions may be formed on the lens holder which engage corresponding depressions or apertures formed in the skirt portion 230 of the free form lens array 210.

Once the lens array assembly 400 has been assembled, the clips 450, 460 integrally formed with the frame of the lens holder 410 extend through correspond holes 250, 260 formed in the free form lens array 210 (shown in FIG. 2), and, when mounted on the PCB 110, the clips 450, 460 extend through corresponding holes 150, 160 (shown in FIG. 1A) to complete a first embodiment of an LED module.

FIG. 6 illustrates an exploded view of such an LED module 500 comprising the PCB 110 and the lens array assembly 400 which comprises the free form lens array 210 and the lens holder 410 as described above. As shown, the apertures or holes 250, 260 formed in the free form lens array 210 may comprise elongate slots to allow for differences in tolerances when the free form lens array 210 is moulded. These elongate slots also provide compensation for any tolerances in the moulding of the lens holder 410.

In addition, the LED module 500 may include a second lens array assembly which is located alongside the lens array assembly 400 so that both groups 120A, 120B of eight LED elements 120 (FIGS. 1A and 1B) on the PCB 110 are associated with secondary lens elements.

Alternatively, for PCB 110 having sixteen secondary lens elements 120, the lens array assembly may comprise twice the size of the lens array assembly 400 and is capable of being mounted over all of the sixteen secondary lens elements 120. In this case, the lens holder may comprise four clips instead of two to provide the desired mounting. Moreover, the lens array assembly may comprise one free form lens array having the requisite number of secondary lens elements and two lens holders 410 may be employed to mount the single free form lens array. Similarly, two free form lens arrays may be mounted using a single lens holder.

It will readily be understood that the LED module 500 can easily be assembled in seconds without the need for any tools, the clips 450, 460 providing the engagement necessary to retain the components of the LED module together.

An another embodiment of a lens holder 610 is shown in FIG. 7. Lens holder 610 comprises a frame having eight apertures 620 shaped to receive a respective one of the lens elements 220 of the free form lens array 210 shown in FIG. 2 when assembled. The lens holder 610 has a first surface and a second surface, the second surface being in contact with a first surface of the free form lens array 210 when assembled in an identical way to that of the lens holder 410 described above with reference to FIGS. 2 to 6.

The frame includes an aperture or hole (not shown) with which the alignment pin 240 of the skirt portion 230 of the free form lens array 210 engages when assembled. This ensures correct orientation of the free form lens array 210 with the lens holder 610 so that the lens elements 220 are located within apertures 620 of the lens holder 610 when the lens holder 610 is assembled with the free form lens array 210.

Clips 650, 660 are provided for engaging corresponding holes 250, 260 formed in the skirt portion 230 of the free form lens array 210 as described above. The clips 650, 660 extend through the holes 650, 660 when the frame 610 is assembled with the free form lens array 610.

Markings 670, 675 on the first surface of the frame 610 are aligned with corresponding markings 270, 275 provided on the first surface of the free form lens array 210, and in particular, on the skirt portion 230 thereof. As described above with reference to FIGS. 2 and 3, secondary lens elements 220 of the free form lens array 210 extend through apertures 620 in the frame so that the convex portion 220A of each secondary lens element is above the frame of the lens holder 610.

The lens holder 610 further comprises eight louvre elements 695 which are used to prevent backlighting from a luminaire in which an LED module including such a lens holder 610 is mounted. This is advantageous to prevent unwanted illumination of house façades in a residential environment.

The material of the lens holder 610 may be made from a light absorptive or reflective material depending on the particular properties required for the louvre elements 695. Alternatively, the lens holder 610 may be made from the same materials as the lens holder 410 but with a suitable coating to modify the light absorption or reflective properties thereof. In one embodiment, only one surface of a louvre element may be coated, that is, the surface which is nearer to the secondary lens element 220.

As described above, the lens holder 610 may be of any suitable size in accordance with the particular application of the LED module (not shown) in which it is implemented.

As an alternative to the embodiment of the free form lens array 210 described above with reference to FIGS. 2 to 7, it is possible to mount each secondary lens element separately on the PCB 110. In this case, each lens element has its own positioning pins which engage with corresponding positioning pins on the PCB 110. Whilst it is possible to mount the secondary lens elements separately, this requires more work during assembly to ensure that there is correct alignment with respect to associated LED elements.

Referring now to FIG. 8, an exploded view of another embodiment of a lens array assembly 700 is shown. The lens array assembly 700 comprises a collimator lens array 310 as described with reference to FIG. 1B and a lens holder 710. In this embodiment, the lens holder 710 is positioned between the collimator lens array 310 and the PCB 110 when an LED module (not shown) including such a collimator lens array is assembled. The lens holder 710 comprises a frame having first and second surfaces as described above with reference to lens holder 410 (FIGS. 2 to 6) and lens holder 610 (FIG. 7).

On the first surface, eight recesses 720 are formed to receive respective ones of the eight secondary lens elements 320 in the collimator lens array 310. The recesses 720 are formed by shaped wall elements 725 extending from the frame and which are arranged, in pairs as shown, to define the recesses. In the illustrated embodiment, each wall element 725 comprises two concave portions 725A, 725B, and, pairs of wall elements 725 are arranged to oppose one another with pairs of concave portions in defining the recesses 720. Each concave portion 725A, 725B includes a clip 725C which cooperates with a clip of an opposed concave portion to engage a secondary lens element 320 of the collimator lens array 310 as will be described in more detail below.

Each recess 720 has a proximal end 720A and a distal end 720B, the proximal end 720A being located adjacent the frame and the distal end 720B being spaced from the frame. In this particular embodiment, the distance between the proximal end 720A and the distal end 720B of a recess is substantially the same as the height of each secondary lens element 320 of the collimator lens array 310.

At the proximal end 720A of each recess 720, a circular aperture 720C is provided in the frame so that the frame can be positioned on the PCB 110 (FIG. 1B) with the LED elements 120 mounted on the PCB 110 being aligned with the circular apertures 720C.

As shown, each secondary lens element 320 of the collimator lens array 310 is substantially conical with a proximal end 320A and a distal end 320B, the distal end 320B having a larger cross section than the proximal end 320A. When the collimator lens array 310 is assembled within the lens holder 710, the proximal end 320A and the distal end 320B of each secondary lens element 320 is respectively aligned with the proximal end 720A and the distal end 720B of each recess 720. The proximal end 320A of each secondary lens element 320 is centred within the recess 720 with respect to the circular aperture 720C associated therewith, and, the distal end 320C is retained in position within the recess 720 by clips 725C of the opposing concave portions of the two wall elements 725 defining the recess 720. This will be described in more detail below with reference to FIGS. 9 and 10.

Figure 9:
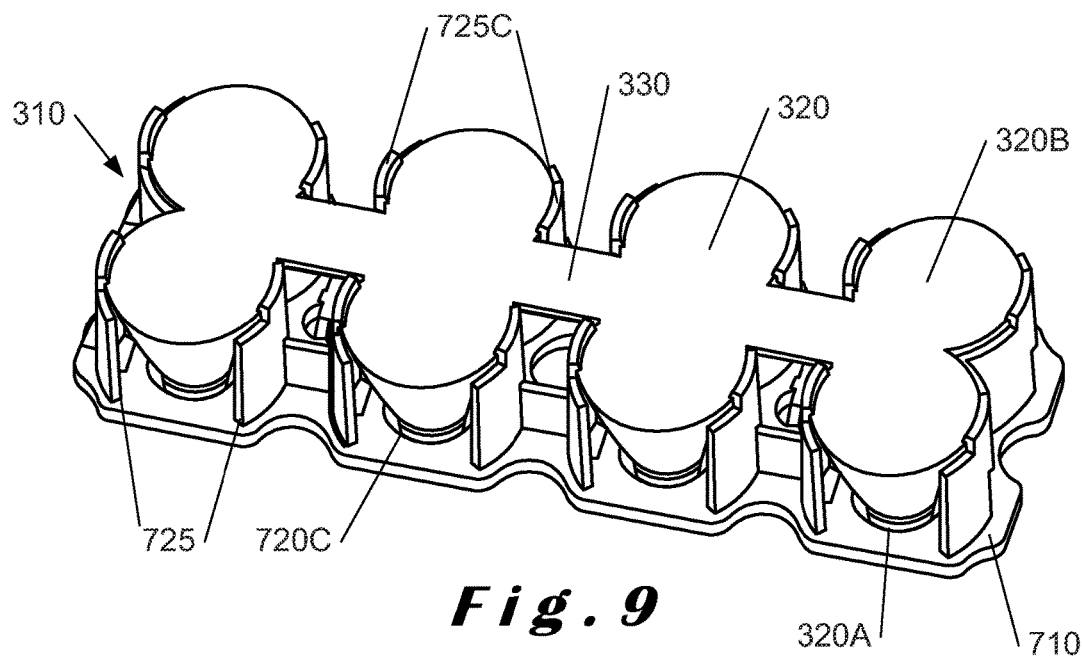
FIG. 9 illustrates a perspective view of the collimator lens array assembly of FIG. 8 when viewed from the top.

FIG. 9 illustrates a perspective view of the lens array assembly 700. As shown, each secondary lens element 320 is retained within one recess 720 with the proximal portion 320A being located in the circular aperture 720C and the clips 725C of the wall elements 725 surrounding a portion of the distal end 320B of the secondary lens element 320.

On the second surface of the lens holder 710, clips 750, 760 are provided which correspond to the clips 450, 460 of the lens holder 410 and the clips 650, 660 of the lens holder 610. In this embodiment, the clips 750, 760 do not extend through the collimator lens array 310 when the collimator lens array 310 is assembled in the lens holder 710.

Alignment pins 780, 790 are provided for engaging respective apertures or holes 180, 190 in the PCB 110. In this case, the alignment pins 780, 790 take the place of the positioning pins 280, 290 of the free form lens array 210 (FIG. 3) to ensure that there is alignment of the lens holder 710 with respect to the LED elements 120 on the PCB 110.

Correct positioning of the lens array assembly 700 with respect to the LED elements 120 on the PCB 110 is guaranteed by the two positioning pins 780, 790 located on the lens holder 710. As described above with reference to FIG. 3, the positioning pins may have the same or different cross-sections to allow for changes due to thermal expansion of an assembled LED module (not shown) without creating deformation in the collimator lens array 310 or the lens holder 710. In the described embodiment, positioning pin 780 has a rhomboid (lozenge) cross section, and, positioning pin 790 has a circular cross-section. As described above, any cross-section combination is possible as long as the positioning pin can accommodate thermal expansion.

Although a wall element of a particular shaped is described with reference to FIGS. 8 to 10 for the lens holder 710, it will readily be appreciated that other differently shaped wall elements are also possible to provide support for the collimator lens array 310. In addition, the collimator lens array 310 may comprise secondary lens elements 320 which are arranged in a different format within the array and connected together in a different manner.

In accordance with the present invention, the free form lens array and the collimator lens array are moulded in a single process so that the secondary lens elements are connected to one another to provide easy of handling during assembly of the lens arrays and then the final LED module.

Figure 10:
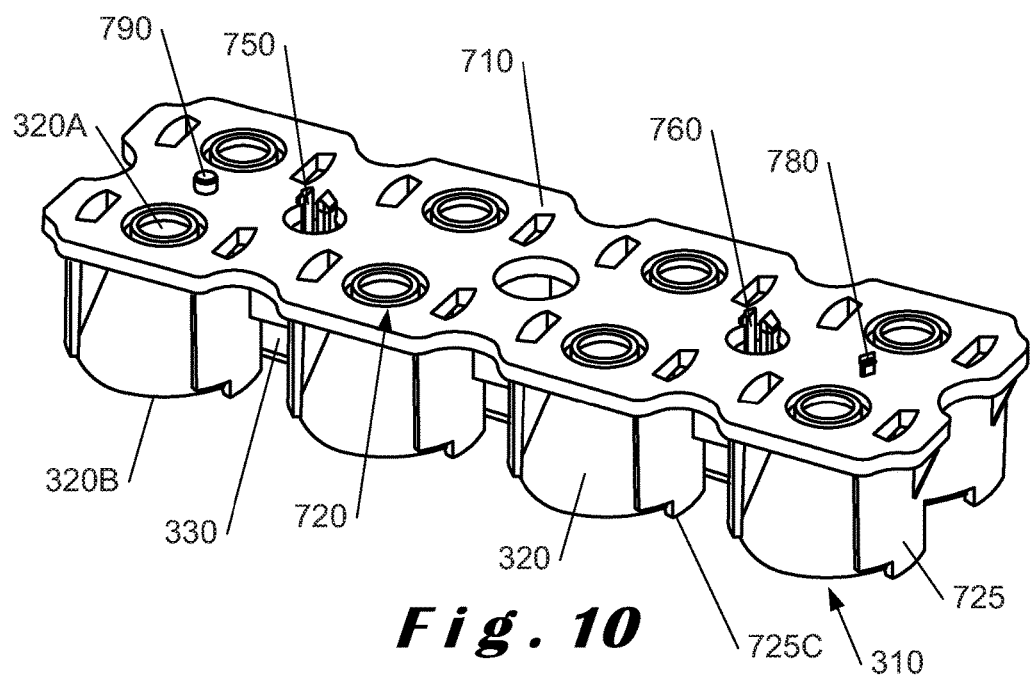
FIG. 10 illustrates a perspective view of the collimator lens array assembly of FIGS. 8 and 9 when viewed from underneath.

The embodiments described above with reference to FIGS. 2 to 7 (free form lens array 210) and FIGS. 8 to 10 (collimator lens array 310) provide accurate positioning of flexible lenses over LED elements on a PCB with the advantages of:
a) easy mounting in an industrial environment without the need for tools;
b) no requirement for adhesives to fix the silicone lens arrays in place over the LED array on the PCB;
c) no requirement for screws or other fixings which penetrate the silicone lens arrays; and
d) the LED modules can operate at higher temperatures without having optical distortions created in the secondary lens elements due to thermal cycling and thermal degradation due to the higher operational temperatures In addition, by providing LED modules which have higher operating temperatures due to the stability of optical grade silicone at such temperatures, it is possible to operate the LED modules at these higher temperatures in luminaires. This means that the luminaires can be operated at higher currents to provide more luminous flux in the same luminaire housing (as is the case for existing designs), or, for a given luminous flux, the required heat dissipation capacity can be reduced with an accompanying material cost saving (as would be the case for new designs).

Although the present invention has been described above with respect to particular embodiments, it will readily be appreciated that other embodiments are also possible.

While illustrative embodiments have been illustrated and described, it will be appreciated that various changes can be made therein without departing from the spirit and scope of the invention.

The embodiments of the invention in which an exclusive property or privilege is claimed are defined as follows:

1. A light-emitting diode module comprising:
   a printed circuit board having a first surface and a second surface;
   a light-emitting diode array mounted on first surface of the printed circuit board, the printed circuit board being configured to provide electrical connections to each light-emitting diode element in the light-emitting diode array;
   a secondary lens array configured to be positioned over the light-emitting diode array, the secondary lens array including a secondary lens element for each light-emitting diode element in the light-emitting diode array; and
   a lens holder configured to be mountable to the printed circuit board and configured to retain each secondary lens element of the secondary lens array in alignment in an x-y plane with respect to each light-emitting diode element of the light-emitting diode array;
   wherein the printed circuit board comprises a first locating feature corresponding to a second locating feature on one of: the secondary lens array and the lens holder, the locating features providing the alignment of the secondary lens array with respect to the light-emitting diode array on the printed circuit board.

2. The module according to claim 1, wherein the lens holder is configured to maintain the secondary lens array at a predetermined distance, in a direction perpendicular to the x-y plane, from the first surface of the printed circuit board.

3. The module according to claim 1, wherein the secondary lens array comprises a free form lens array having a first surface and a second surface located on opposite sides thereof, the secondary lens elements being formed as a convex surface in the first surface and as a concave surface in the second surface, respectively, of the free form lens array.

4. The module according to claim 3, wherein the lens holder comprises a frame operable to secure the free form lens array to the printed circuit board, the frame having a first surface and a second surface which are located on opposite sides thereof with apertures formed therethrough for receiving respective ones of the secondary lens elements.

5. The module according to claim 4, wherein the frame includes at least one hole for receiving at least one pin formed in the first surface of the free form lens array, the first surface of the free form lens array being aligned with a second surface of the lens holder so that each pin extends through an associated hole.

6. The module according to claim 3, wherein the secondary lens array is positioned between the first surface of the printed circuit board and the second surface of the lens holder.

7. The module according to claim 3, wherein the second surface of the free form lens array further comprises at least one positioning pin for engaging a corresponding recess formed in the printed circuit board.

8. The module according to claim 7, wherein the second surface of the free form lens array comprises two positioning pins, each positioning pin having a different cross-section.

9. The module according to claim 3, wherein the lens holder further comprises an element for each secondary lens element of the free form lens array formed in the first surface of the lens array in the proximity of an associated aperture to prevent backlighting.

10. The module according to claim 1, wherein the secondary lens array comprises a collimator lens array including a plurality of collimator lens elements.

11. The module according to claim 10, wherein the lens holder comprises a frame operable to mount the collimator lens array to the printed circuit board, the frame having a first surface and a second surface which are located on opposite sides thereof, the first surface having a plurality of recesses defined therein, each recess corresponding to a light-emitting diode of the light-emitting diode array and being operable to receive an associated collimator lens element.

12. The module according to claim 11, wherein the lens holder further comprises at least one clip formed in an edge portion of each recess, each clip being operable to retain a collimator lens element in the associated recess.

13. The module according to claim 10, wherein the lens holder includes at least one positioning pin located on its second surface for engaging a corresponding aperture formed at least in the first surface of the printed circuit board.

14. The module according to claim 13, wherein the lens holder includes two positioning pins each having a cross-section, and the first surface of the printed circuit board has two apertures each being shaped to receive a corresponding positioning pin.

15. The module according to claim 1, wherein the secondary lens array comprises an optical grade silicone material.

16. The module according to claim 1, wherein the lens holder is configured to provide alignment between the secondary lens array and the printed circuit board in a direction perpendicular to the x-y plane.

17. The module according to claim 1, wherein the lens holder is configured to maintain the secondary lens elements at a predetermined distance from the light-emitting diode elements.

18. The module according to claim 1, wherein the lens holder is configured to maintain a skirt portion of the secondary lens array in contact with the printed circuit board.

19. A luminaire having a light-emitting diode module, the light-emitting diode module comprising:
   a printed circuit board having a first surface and a second surface;
   a light-emitting diode array mounted on first surface of the printed circuit board, the printed circuit board being configured to provide electrical connections to each light-emitting diode element in the light-emitting diode array;
   a secondary lens array configured for being positioned over the light-emitting diode array, the secondary lens array including a secondary lens element for each light-emitting diode element in the light-emitting diode array; and
   a lens holder configured to be mountable to the printed circuit board and configured for retaining each secondary lens element of the secondary lens array in alignment in an x-y plane with respect to each light-emitting diode element of the light-emitting diode array;
   wherein the printed circuit board comprises a first locating feature corresponding to a second locating feature formed on one of: secondary lens array and the lens holder for providing the alignment of the secondary lens array with respect to the light-emitting diode array on the printed circuit board.

20. A method of assembling a light-emitting diode module comprising a printed circuit board having a first surface and a second surface, a light-emitting diode array mounted on the first surface of the printed circuit board, a secondary lens array, and a lens holder having a first surface and a second surface, the method comprising:
   providing a first locating feature on the first surface of the printed circuit board;
   providing a second locating feature on one of: the secondary lens array and the second surface of the lens holder;
   forming a lens array assembly by assembling the secondary lens array in the lens holder; and
   mounting the lens array assembly on the first surface of the printed circuit board with the first location feature cooperating with the second locating feature to align the secondary lens array with the light-emitting diode array in an x-y plane.

* * * * *